United States Patent [19]

Hayashi

[11] Patent Number: 4,631,017

[45] Date of Patent: Dec. 23, 1986

[54] APPARATUS FOR ROLLING PLASTIC DOUGH

[75] Inventor: Torahiko Hayashi, Utunomiya, Japan

[73] Assignee: Rheon Automatic Machinery Co., Ltd., Japan

[21] Appl. No.: 789,559

[22] Filed: Oct. 21, 1985

[30] Foreign Application Priority Data

Oct. 20, 1984 [JP] Japan .................................. 59-220767

[51] Int. Cl.$^4$ ............................................... A21C 3/02
[52] U.S. Cl. ................................... 425/335; 425/367; 425/373; 425/394; 425/409
[58] Field of Search ............... 425/101, 363, 335, 337, 425/394, 406, 409, 364, 367, 383, 373; 426/502

[56] References Cited

U.S. PATENT DOCUMENTS 4,178,147 12/1979 Hayashi ............................... 425/372
4,192,636 3/1980 Hayashi et al. ..................... 426/502
4,276,317 6/1981 Hayashi ............................... 426/502
4,478,565 10/1984 Thompson ........................... 425/296

Primary Examiner—Willard E. Hoag
Attorney, Agent, or Firm—Guy W. Shoup

[57] ABSTRACT

An apparatus for rolling plastic dough is provided. Two conveyors and one roller between them are serially arranged and driven at different speeds. A circular endless roller mechanism is disposed above the conveyors and adapted to be displaced along the conveyance path to adjust the thickness of a dough sheet to be obtained. The roller between the conveyors can move vertically to adjust the vertical distance from it to the endless roller path of the roller mechanism.

The combination of these devices make possible an effective rolling and stretching of the dough while the thickness of the dough to be flattened is easily adjusted.

4 Claims, 4 Drawing Figures

FIG. I (A)
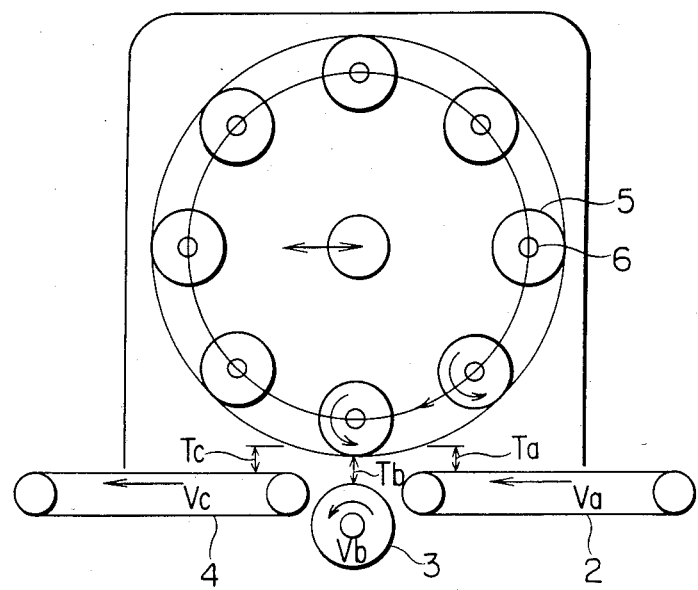
FIG. I (B)
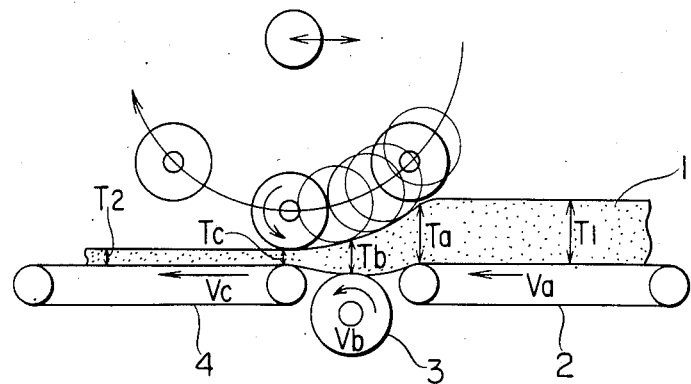

APPARATUS FOR ROLLING PLASTIC DOUGH

BACKGROUND OF THE INVENTION

1. Field of the Invention

The present invention relates to an apparatus for rolling confectionary dough, bread dough, noodle dough, and the like to form a sheet of dough, and particularly to an apparatus for rolling plastic dough whereby the thickness of the dough to be flattened can be easily selected.

2. Description of Prior Art

U.S. Pat. No. 4,178,147 teaches a stretcher of dough for cakes, bread, and the like, comprising a roller mechanism with a plurality of rollers forming an endless roller path having a lower straight portion, and transport means including an intake conveyor, an outlet conveyor, and at least one transport roller between them and arranged below the straight portion and in series with each other. The dough fed on the belt of the intake conveyor is flattened mainly by the stretching caused by conveying speed differences between the intake conveyor and the transport roller, and between the transport roller and the outlet conveyor, and an endless roller mechanism is in rolling contact with the dough surface to assist the stretching.

Although this apparatus can effectively stretch the dough, it requires a roller mechanism which has a roller path comprising a straight portion, resulting in a complex mechanism which leads to high costs.

Furthermore, because the positional relationship between the roller mechanism and the transport means below the rollers is stationary, the thickness of the dough to be flattened cannot be easily changed.

SUMMARY OF THE INVENTION

An object of the present invention is to provide an apparatus for rolling plastic dough to form a sheet of dough with a high stretching ratio of dough without damaging the gluten structure of the dough.

Another object of the present invention is to provide an apparatus for rolling dough in which the thickness of the dough to be flattened can be easily changed.

In one aspect of the present invention, an apparatus for rolling plastic dough is provided, comprising a frame; a conveyor assembly consisting of an intake conveyor, an outlet conveyor, and a center roller positioned between the two conveyors, the conveyors and the center roller being driven so that the peripheral speed of the center roller is greater than the speed of the intake conveyor and the speed of the outlet conveyor is greater than the peripheral speed of the center roller; and an endless roller mechanism having a plurality of rollers arranged above the conveyor assembly and with an arcuate path for the rollers at its bottom, the endless roller mechanism being movable forwardly and rearwardly along the conveyance path of the conveyor assembly to adjust the thickness of the dough to be flattened, and the center roller being vertically movable to satisfy the formula:

$$Ta > Tb > Tc$$

wherein $Ta$ is the distance between the rear end of the conveyance path of the intake conveyor and the outermost periphery of the roller path of the endless roller mechanism, $Tb$ is the distance between the center roller and the outermost periphery of the roller path of the endless roller mechanism, and $Tc$ is the distance between the front end of the conveyance path of the outlet conveyor and the outermost periphery of the roller path of the endless roller mechanism.

The apparatus for rolling plastic dough according to the present invention comprises two conveyors, an intake conveyor and an outlet conveyor, a center roller between them, and an endless roller mechanism. The conveyors can be any of the conventional-type conveyors suitable for conveying dough, such as a conveyor belt supported by an upstream end roller and a downstream end roller. The conveyors convey a continuous dough body. The center roller supports dough fed from the intake conveyor and rotates in such a direction that the dough is transported to the outlet conveyor.

The speed of the conveyors or the peripheral speed of the center roller is arranged so that the speed of the outlet conveyor is greater than the peripheral speed of the center roller, and the peripheral speed of the center roller is greater than the speed of the intake conveyor.

The roller mechanism comprises a plurality of rollers arranged to move along an endless path while rotating around their axes. The rollers move along a path with an arcuate portion at its bottom. The path can be circular. The rollers move in such a direction that at the bottom of the path the direction is the same as that of the conveyance of the dough. Each roller constituting the roller mechanism is freely rotatable about its axis by friction resulting from its contact with the dough or with a friction plate. The path may be modified to any shape other than circular, provided that at its bottom portion the path forms an arc tangential to the conveyance path for the dough.

The center roller is placed at a position most suitable for the operation. In order to attain this purpose, the distance between the roller and the bottom of the roller mechanism is smaller than the distance between the downstream end of the conveyance path of the intake conveyor and the roller assembly measured in the vertical direction, and is greater than the distance between the upstream end of the conveyance path of the outlet conveyor and the roller assembly measured in the vertical direction. The dough fed between the roller mechanism and the intake conveyor is compressed, flattened, and stretched due to the differences between the speed of the intake conveyor, the peripheral speed of the center roller, and the speed of the outlet conveyor. The endless roller mechanism can be displaced horizontally along the conveyance path of the conveyor assembly. If it is displaced toward the outlet conveyor, the distance between the upstream end of the conveyance path of the outlet conveyor and the roller mechanism will decrease, while the distance between the center roller and the roller mechanism increases. This displacement results in adjusting the thickness of the dough to be flattened. The center roller between the two conveyors can also be vertically displaced to adjust the distance between the center roller and the roller mechanism, whereby the optimum gradual thickness reduction of the dough can be obtained.

Since the apparatus according to the present invention is provided with a conveyor assembly consisting of an intake conveyor, an outlet conveyor, and a center roller positioned between the two conveyors, and an endless roller mechanism, an effective rolling and stretching operation can be realized by the apparatus of a relatively simple mechanism.

Furthermore, since the apparatus of the invention is provided with a device to move the roller mechanism forwardly and rearwardly along the conveyance path of the conveyor assembly to adjust the thickness of the dough to be flattened, the apparatus can carry out effective production control. Also, since the center roller between the intake and outlet conveyors can be vertically displaced for a certain length the apparatus can attain easy adjustments of the distance between the center roller and the outermost periphery of the roller path of the endless roller mechanism to ensure the gradual reduction of the thickness of the plastic dough.

BRIEF DESCRIPTION OF THE DRAWINGS

FIG. 1(A) is a schematic side elevation view of an embodiment of the present invention.

FIG. 1(B) is a schematic side elevation view illustrating the operation of the present invention.

DESCRIPTION OF THE PREFERRED EMBODIMENT

An embodiment of the present invention will now be described with reference to the drawings.

Figure 2:
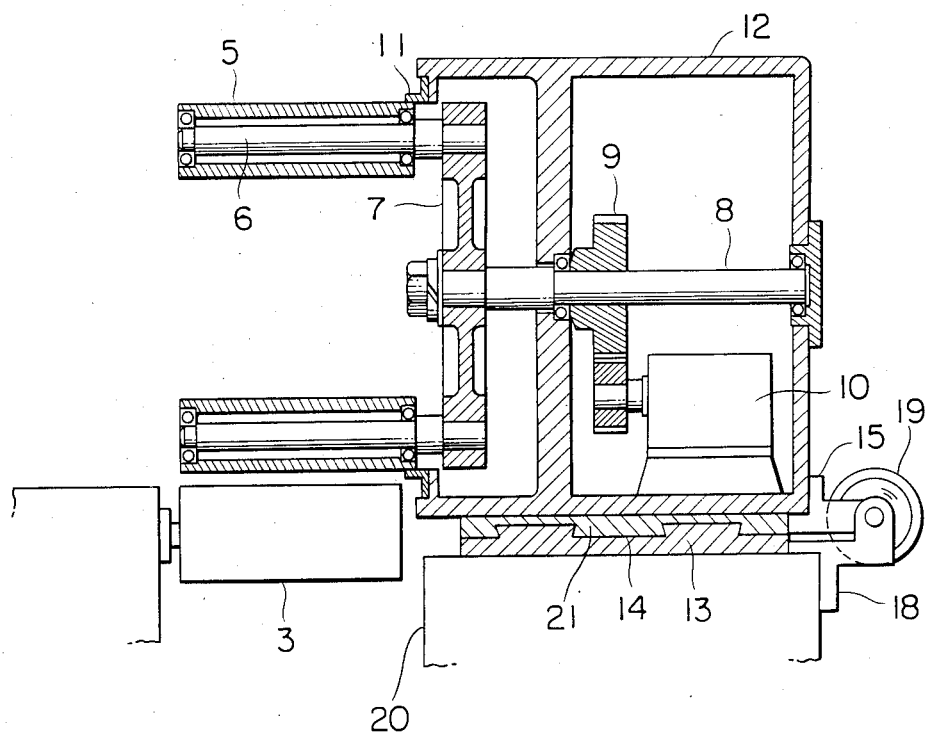
FIG. 2 is a partial sectional view of an embodiment of the present invention.

In FIG. 1(A) and FIG. 2, an intake conveyor 2, an outlet conveyor 4, and a center roller 3 are serially disposed and driven at different speeds, Va, Vb, and Vc. Each conveyor comprises a conveyor belt and two supporting rollers, one of which is a driven roller, at the upstream end and at the downstream end.

An endless roller mechanism having a plurality of rollers 5 freely rotatably mounted on shafts 6 is disposed above the conveyor assembly. In this embodiment, the endless roller mechanism has a circular roller path.

Each shaft 6 is mounted on a wheel 7 around its periphery. The wheel 7 is secured at its center to a drive shaft 8. The shaft 8 is freely rotatably mounted on a housing 12 and adapted to be rotated through a gear 9 fixedly mounted on the shaft 8, which gear meshes with a gear mounted to and rotated by the motor 10.

Thus, by driving the motor 10, each roller 5 travels along an endless roller path of the roller mechanism. Each roller rotates about the shaft 6 by friction with a friction plate 11.

Figure 3:
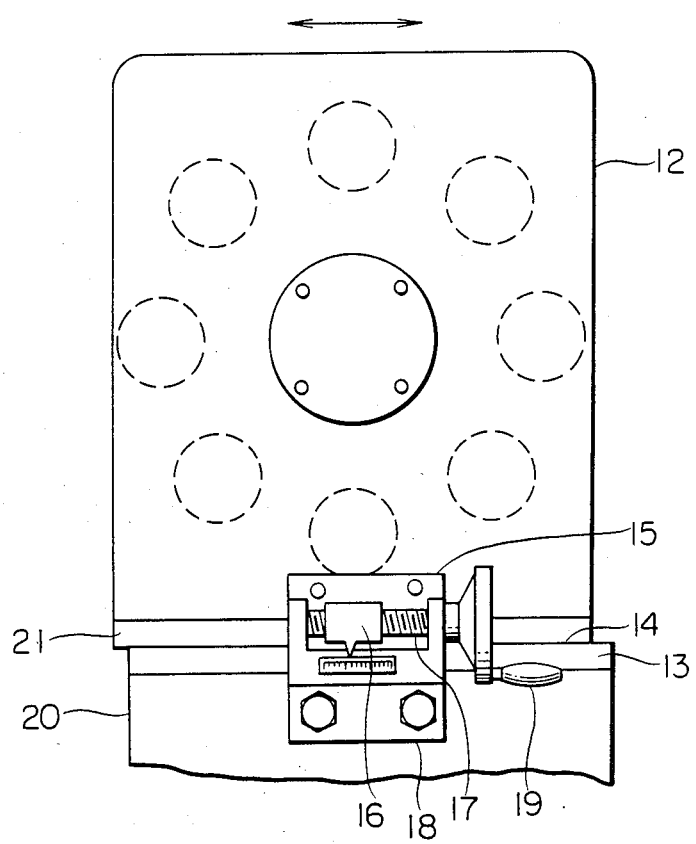
FIG. 3 is a side elevation view of an embodiment of the present invention showing a device to displace the roller mechanism along the conveyance path of a conveyor assembly.

Referring to FIG. 2 and FIG. 3, a sliding member 21 is secured to the bottom surface of the housing 12. The sliding member 21 has a sliding surface 14, which is adapted to slide on a base 13 secured to the upper surface of a frame 20.

A bracket 15 is mounted on the housing 12 and the sliding member 21, and a female screw 16 is mounted on the outer end of the bracket 15. A male screw 17, having a handle 19 at an end, is rotatably mounted on a fixed member 18 secured to the base 13 and the frame 20. Consequently, when the handle 19 is turned, the bracket 15 and the housing 12 slides on the base 13.

Referring now to FIG. 1(B), dough 1, which is of a thickness of $T_1$, is fed on the intake conveyor and rolled out and stretched by the rollers 5 and the conveyors 2 and 4 and the center roller 3 into a dough sheet of a thickness of $T_2$. The rollers 5 and the conveyor assembly compress and roll out the dough. The differences between the peripheral speed of the center roller 3 and the speed of the intake conveyor 2 and between the speed of the outlet conveyor 4 and the peripheral speed of the center conveyor 3 help stretch the dough effectively. Thus, this cooperation between the rollers and conveyor mechanism causes the dough to be flattened to a predetermined thickness $T_2$.

Ta, Tb, and Tc are the distances between the rear end of the conveyance path of the intake conveyor 2 and the outermost periphery of the roller path of the endless roller mechanism, the distance between the center roller 3 and the outermost periphery of the endless roller mechanism, and the distance between the front end of the conveyance path of the outlet conveyor 4 and the outermost periphery of the endless roller mechanism, measured in the vertical direction, respectively.

Sliding movements of the endless roller mechanism on the base 13 caused by turning the handle 19 as shown by an arrow in FIG. 1(A) and FIG. 1(B) adjust the Ta, Tb, and Tc. Furthermore, Tb is adjusted by vertical movements of the center roller 3 to satisfy the following formula:

$$Ta > Tb > Tc$$

This adjustment ensures an optimum distance Tb to gradually reduce the thickness of the dough.

Va, Vb, and Vc are the speed of the intake conveyor 2, the peripheral speed of the center roller 3, and the speed of the outlet conveyor 4, respectively.

The amount of the dough 1 passing between the endless roller mechanism and the conveyor assembly should be constant. Accordingly, the following relational expression may be formed:

$$Ta \cdot Va = Tb \cdot Vb = Tc \cdot Vc$$

Therefore, when Tc is a predetermined value, Vb and Va are given by the following relational expression:

$$Vb = \frac{Tc \cdot Vc}{Tb}, \ Va = \frac{Tc \cdot Vc}{Ta}$$

Thus, the speed Vc of the outlet conveyor 4 is greater than the peripheral speed Vb of the center roller 3, and the peripheral speed Vb of the center roller 3 is greater than the speed Va of the intake conveyor 2.

The apparatus of the present invention is very effective in stretching dough products since it can stretch them in an extremely limited stretching zone extending from the rear end of the intake conveyor to the front end of the outlet conveyor, both ends being intervened only by the center roller. In the present invention, because the endless roller mechanism and the conveyor assembly function in combination, the dough is stretched without damaging the gluten structure and high-quality products can be obtained.

Furthermore, a desired thickness of the dough is easily adjusted by displacing the endless roller mechanism, and the optimum gradual reduction of the thickness of the plastic dough is obtained by vertically displacing the center roller, according to the present invention. The friction plate 11 may be omitted, in which case the rollers 5 are rotated by the friction caused by their contact with the dough on the conveyor mechanism. However, the friction plate is useful in maintaining a constant peripheral speed of the roller.

The path of the roller mechanism may take various shapes, but the bottom portion should be arcuate so that the desired positional relationship between the conveyor assembly and the roller mechanism can be maintained.

I claim:

1. An apparatus for rolling plastic dough, comprising a frame; a conveyor assembly consisting of an intake conveyor, an outlet conveyor, and center roller positioned between the two conveyors, the conveyors and the center roller having driving means such that the peripheral speed of the center roller is greater than the speed of the intake conveyor and the speed of the outlet conveyor is greater than the peripheral speed of the center roller; and an endless roller mechanism having a plurality of rollers arranged above the conveyor assembly and with an arcuate path for the rollers at its bottom, the endless roller mechanism being movable forwardly and rearwardly, as a whole, along the conveyance path of the conveyor assembly to adjust the thickness of the dough to be flattened, and the center roller being vertically movable to satisfy the formula:

$$Ta > Tb > Tc$$

wherein Ta is the distance between the rear end of the conveyance path of the intake conveyor and the outermost periphery of the roller path of the endless roller mechanism, Tb is the distance between the center roller and the outermost periphery of the roller path of the endless roller mechanism, and Tc is the distance between the front end of the conveyance path of the outlet conveyor and the outermost periphery of the roller path of the endless roller mechanism.

2. An apparatus according to claim 1, wherein a friction plate is mounted on the frame at a position where it frictionally engages the rollers of the endless roller mechanism.

3. An apparatus according to claim 1, wherein the endless roller mechanism has a circular path for the rollers.

4. An apparatus according to claim 2, wherein the endless roller mechanism has a circular path for rollers.

* * * * *